United States Patent [19]

Takeda

[11] Patent Number: 5,262,832
[45] Date of Patent: Nov. 16, 1993

[54] COLOR SEPARATION OPTICAL SYSTEM FOR USE IN COLOR COPYING MACHINE

[75] Inventor: Katsuhiko Takeda, Okazaki, Japan

[73] Assignee: Minolta Camera Kabushiki Kaisha, Osaka, Japan

[21] Appl. No.: 724,124

[22] Filed: Jul. 1, 1991

[30] Foreign Application Priority Data

Jul. 3, 1990 [JP] Japan .................. 2-176931

[51] Int. Cl.$^5$ ............................................ G03G 21/00
[52] U.S. Cl. ................................ 355/326 R; 355/202; 359/890
[58] Field of Search ............... 355/202, 326, 327, 32, 355/35, 71; 359/884, 889, 890; 358/75; 346/157

[56] References Cited

U.S. PATENT DOCUMENTS

| | | | |
|---|---|---|---|
| 3,499,697 | 3/1970 | Edwards | 359/890 X |
| 3,679,290 | 7/1972 | Adams et al. | 359/890 X |
| 3,825,337 | 7/1974 | Lucas | 359/890 X |
| 3,967,894 | 7/1976 | Tsilibes | 355/71 X |
| 4,106,870 | 8/1978 | Kondo et al. | 355/327 |
| 4,800,474 | 1/1989 | Bornhorst | 359/889 X |
| 5,066,985 | 11/1991 | Yamanashi | 355/326 |

FOREIGN PATENT DOCUMENTS 62-269173 11/1987 Japan .

Primary Examiner—R. L. Moses
Assistant Examiner—J. E. Barlow, Jr.
Attorney, Agent, or Firm—Price, Gess & Ubell

[57] ABSTRACT

A color separation system for use in a color copying apparatus including blue, green and red reflection filters as well as blue and green transmission filters. The blue and green transmission filters are disposed in front of the blue and green reflection filters, respectively, so that light passes through the transmission filters twice. The color copying apparatus includes a photosensitive member which is exposed with light passing through the color separation system, an image sensor for reading an image of an color original, and a light adjusting filter for adjusting a quantity of light impinging on said image sensor. The three reflection filters and the light adjusting filter are mounted on a rotary member. One of these filters is selectively positionable in an optical path according to the rotated position of the rotary member.

23 Claims, 7 Drawing Sheets

COLOR SEPARATION OPTICAL SYSTEM FOR USE IN COLOR COPYING MACHINE

BACKGROUND OF THE INVENTION

1. Field of the Invention

The present invention relates to color separation systems, and more particularly to a color separation system for use in color copying apparatus.

2. Description of the Related Art

Japanese Laid-Open Patent Application No. 62-269173 discloses a color copying machine wherein the light reflected from color documents is subjected to color separation for exposing the photosensitive member to the resulting light. The disclosed color copying machine has a first half mirror for reflecting the light of one of blue, green and red colors, and a second half mirror for reflecting the light of one color as separated from the light of two colors passing through the first half mirror. The light of each color passes through one of different optical paths and reaches a particular photosensitive member. The optical path for the light reflected from the first half mirror is provided with a transmission filter for blocking the light of color to be passed through the first half mirror.

Accordingly, the color separation optical system of the color copying machine comprises the combination of a reflection filter and a transmission filter as the half mirror, whereby the ripple produced by the reflection filter can be blocked by the transmission filter.

However, for the transmission filter to exhibit improved spectral characteristics, the filter needs to have an increased number of film layers when in the form of an interference filter or to be larger in film thickness when in the form of an absorption filter. The interference filter increased in the number of film layers, is costly and has the drawback of being prone to separation between the film layers, while the absorption filter, of larger film thickness, encounters difficulty in forming a uniform film and has the drawback of being low in optical efficiency.

SUMMARY OF THE INVENTION

Accordingly, the main object of the present invention is to provide a color separation optical system which is simple in construction and less costly.

Another object of the invention is to provide a color separation optical system having satisfactory spectral characteristics.

Another object of the invention is to provide a color copying machine having an improved color separation optical system.

BRIEF DESCRIPTION OF THE DRAWINGS

These and other objects of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An embodiment of the present invention will be described below.

Figure 1:
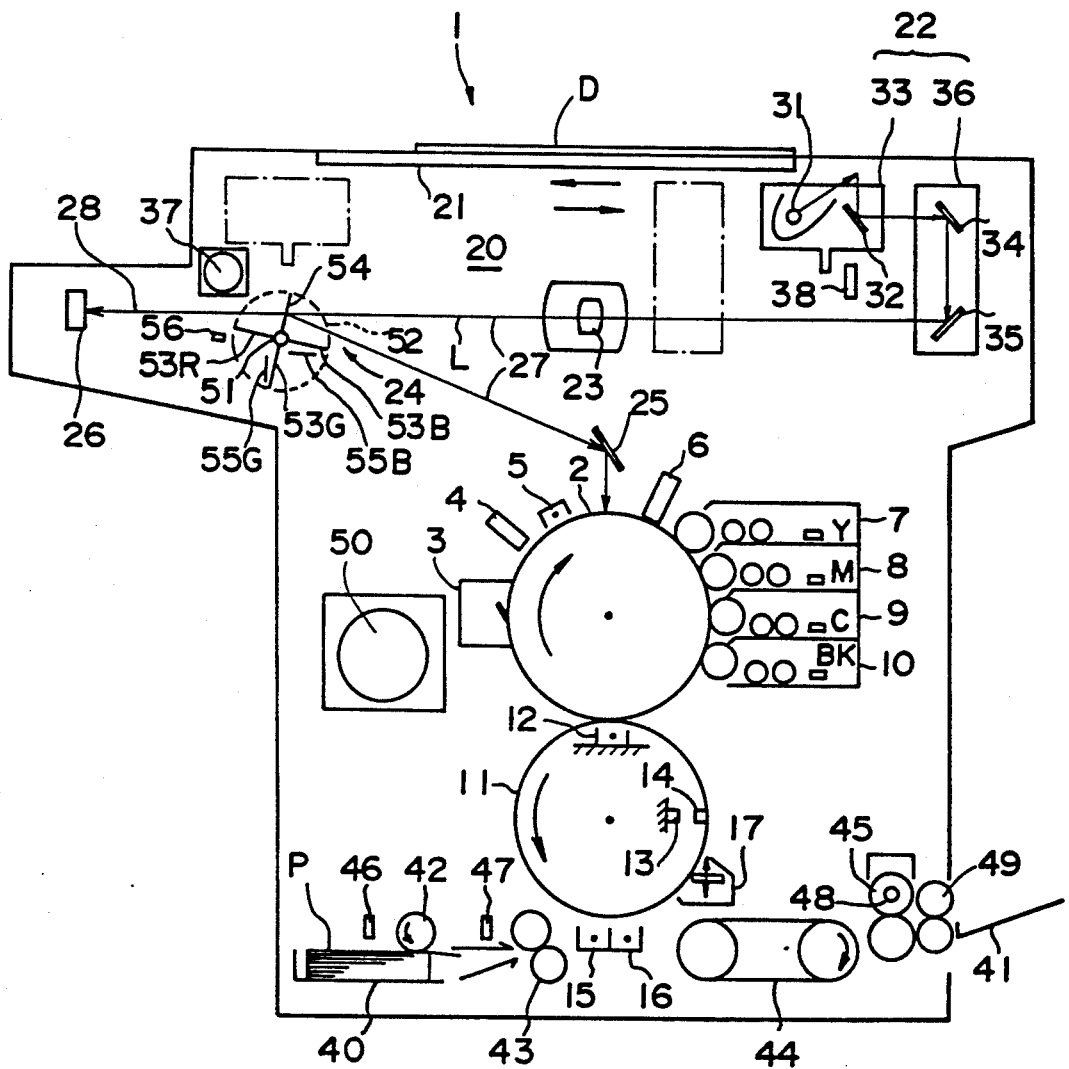
FIG. 1 is a diagram showing the construction of a color copying machine embodying the invention.

First, the overall construction of a color copying machine 1 will be described generally with reference to FIG. 1.

A photosensitive drum 2 is disposed in the body of the copying machine 1 approximately centrally thereof and is rotatable clockwise. Arranged around the drum 2 are a cleaner unit 3, main eraser lamp 4, sensitizing charger 5, partial eraser 6 comprising an LED array for partially erasing latent images on the drum 2 as divided into predetermined unit image areas, developing units 7 to 10, and transfer belt 11 serving as an intermediate transfer member.

The drum 2, which has a photosensitive layer over the outer peripheral surface thereof, moves past the main eraser lamp 4 and the sensitizing charger 5, whereby the photosensitive layer is uniformly charged. The optical system 20 to be described later exposes the layer to light to form an electrostatic latent image thereon.

The developing units 7, 8, 9 and 10 contain yellow (Y), magenta (M), cyan (C) and black (BK) toners, respectively. These developing units 7 to 10 need not always be fixedly arranged around the drum 2 but may be, for example, upwardly and downwardly movable together insofar as the toners of different colors can be selectively supplied to the photosensitive drum 2.

The transfer belt 11 serves to temporarily retain thereon the toner images developed by the developing units 7 to 10, is supported as reeved around a plurality of unillustrated rollers and is revolvable counterclockwise in contact with the drum 2. The toner images of different colors are superposed on the transfer belt 11.

Arranged inside the transfer belt 11 are a transfer charger 12 for transferring (primary transfer) the toner image from the drum 2 to the transfer belt 11, and a position sensor 13 for detecting the revolved position of the belt 11 by detecting a belt mark 14 on the belt 11.

Arranged outside the transfer belt 11 are a transfer charger 15 for transferring (secondary transfer) the toner image from the belt 11 to paper P, a separating charger 16 for separating the paper P from the belt 11, and a belt cleaner 17 for cleaning the transfer belt 11. The belt cleaner 17 is movable into and out of contact with the belt 11.

The optical system 20 is provided in the upper portion of the color copying machine 1. The optical system 20 comprises a scanner 22 reciprocatingly movable below a document support glass plate 21, image forming lens 23, spectral filter unit 24 for projecting light upon color separation, fixed mirror 25, CCD color image sensor 26, etc. This arrangement provides an analog optical path 27 and a digital optical path 28. More specifically, the light from the scanner 22 passes through the image forming lens 23, is reflected at the filter unit 24 and fixed mirror 25 and impinges on the photosensitive drum 2 along the path 27. The light through the filter unit 24 is incident on the image sensor 26 along the path 28. During the forward movement of the scanner 22, a document D is scanned, and the drum 2 is exposed to the light reflected from the document, or the image data of the document is read by the image sensor 26. The image data read by the image sensor 26 is used for discriminating black pixels from other pixels to control the operation of the partial eraser 6 and to reproduce the black portion of the document image only with the black toner and the other portion thereof with a suitable combination of toners of three primary colors.

The scanner 22 comprises a first slider 33 having an exposure lamp 31 and a mirror 32, and a second slider 36 having mirrors 34, 35. To scan the document D, a scan motor 37 drives the first slider 33 at a velocity of V/n wherein V is the peripheral speed of the drum 2, and n is a copying magnification, and the second slider 36 at a velocity of V/2n, for the forward travel of these sliders. Indicated at 38 is a scanner home switch for detecting the return of the scanner 22 to its reference position (home position).

The color copying machine 1 has a paper cassette 40 loaded in its lower portion at one side thereof and having paper P accommodated therein, and a paper discharge tray 41 attached to the other side of the lower portion for receiving the paper P having copy images formed thereon. The paper P is delivered from the cassette 40 by a feed roller 42 one sheet after another, transported by a timing roller 43 as timed with the transfer belt 11, receives the toner image from the belt 11 by secondary transfer and is thereafter sent to a fixing roller 45 by a conveyor belt 44. A paper size sensor 46 is disposed in the vicinity of the feed roller 42 for detecting the size of paper P. A timing sensor 47 is provided in the vicinity of the timing roller 43 for detecting the leading end of paper P being sent forward. The fixing roller 45 has incorporated therein a heater lamp 48 for fixing the toner image to the paper P on melting. The paper P bearing the toner image fixed thereto is delivered onto the tray 41 by a discharge roller 49.

Provided in the center of one side of the copying machine 1 is a main motor 50 for driving the drum 2, transfer belt 11, feed roller 42, timing roller 43, conveyor belt 44, fixing roller 45, discharge roller 49, etc.

Figure 2:
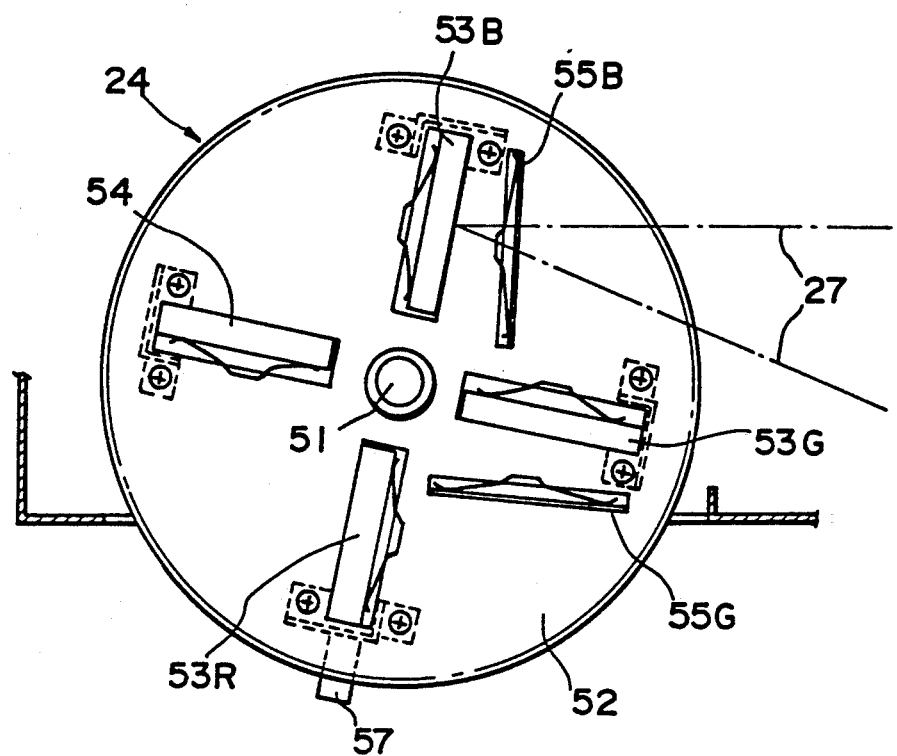
FIG. 2 is a view showing the construction of a spectral filter unit included in the color copying machine shown in FIG. 1.

As shown in detail in FIG. 2, the spectral filter unit 24 comprises a rotary member 52 rotatable about a horizontal axis 51 perpendicular to the optical axis of the image forming lens 23, and three reflection filters 53B, 53G, 53R and a light adjusting filter 54 which are arranged radially at an angular spacing of 90 degrees about the axis of rotation and mounted on the rotary member 52. One of these filters is selectively positionable in the optical path according to the rotated position of the rotary member 52. Transmission filters 55B, 55G are arranged in front of the reflection filters 53B, 53G, respectively, and inclined with respect to the optical axis. A reference position sensor 56 (FIG. 8) is disposed at one side of the rotary member 52 for detecting the rotated position of the member by detecting a projection 57 on the rotary member 52.

Figure 9:
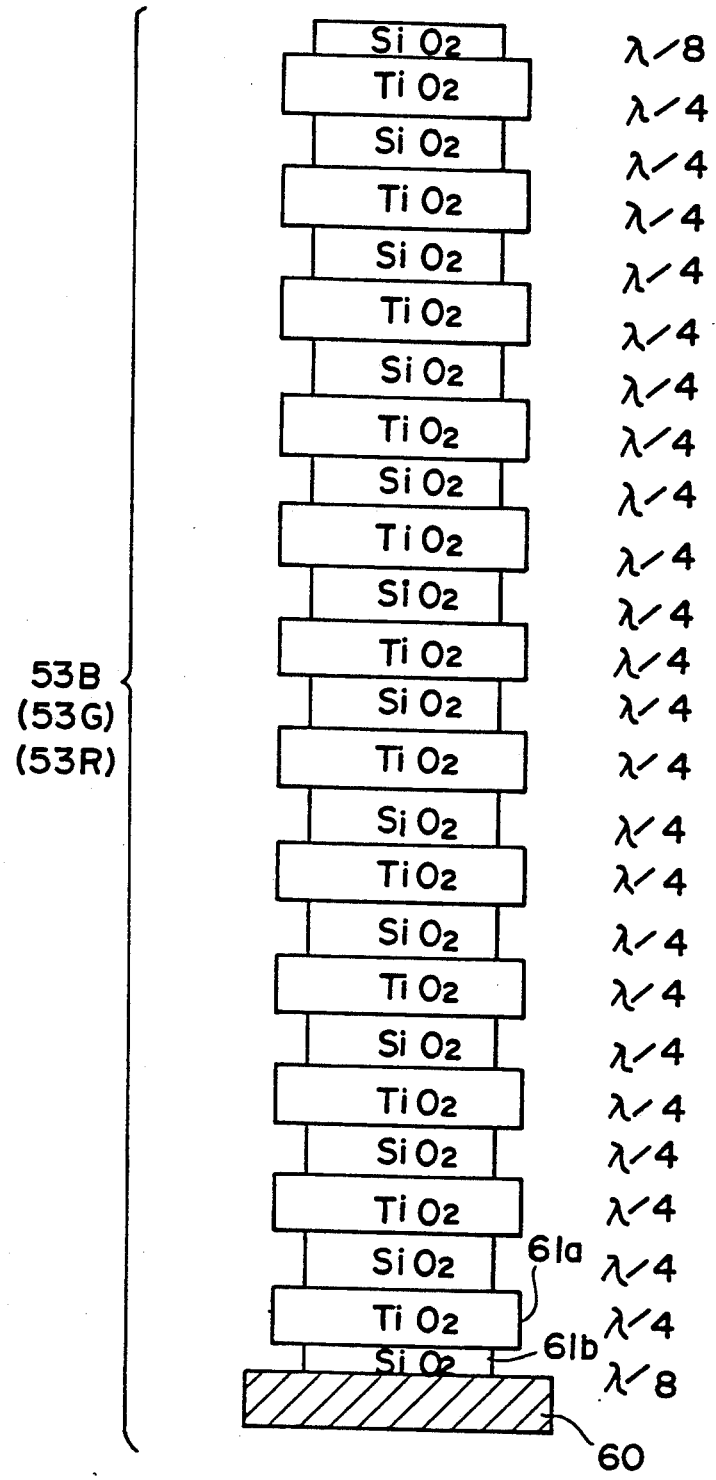
FIG. 9 is a diagram showing the construction of a reflection filter included in the filter unit of FIG. 2.

With reference to FIG. 9, each of the reflection filters 53B, 53G, 53R is an interference filter comprising high refractive index layers ($TiO_2$) 61a and low refractive index layers ($SiO_2$) 61b arranged alternately and laminated to one surface of a glass plate 60. Assuming that the design wavelength is $\lambda$, the first layer next to the glass plate 60 is a low refractive index layer with a thickness of $\lambda/8$, the second layer to the 24th layer are layers with a thickness of $\lambda/4$, and the last 25th layer is a low refractive index layer with a thickness of $\lambda/8$. The reflection filters 53B, 53G, 53R are used for the Y, M, C toners, respectively, in corresponding relation thereto, and the light reflected from these filters is guided to the photosensitive drum 2.

Figure 10:
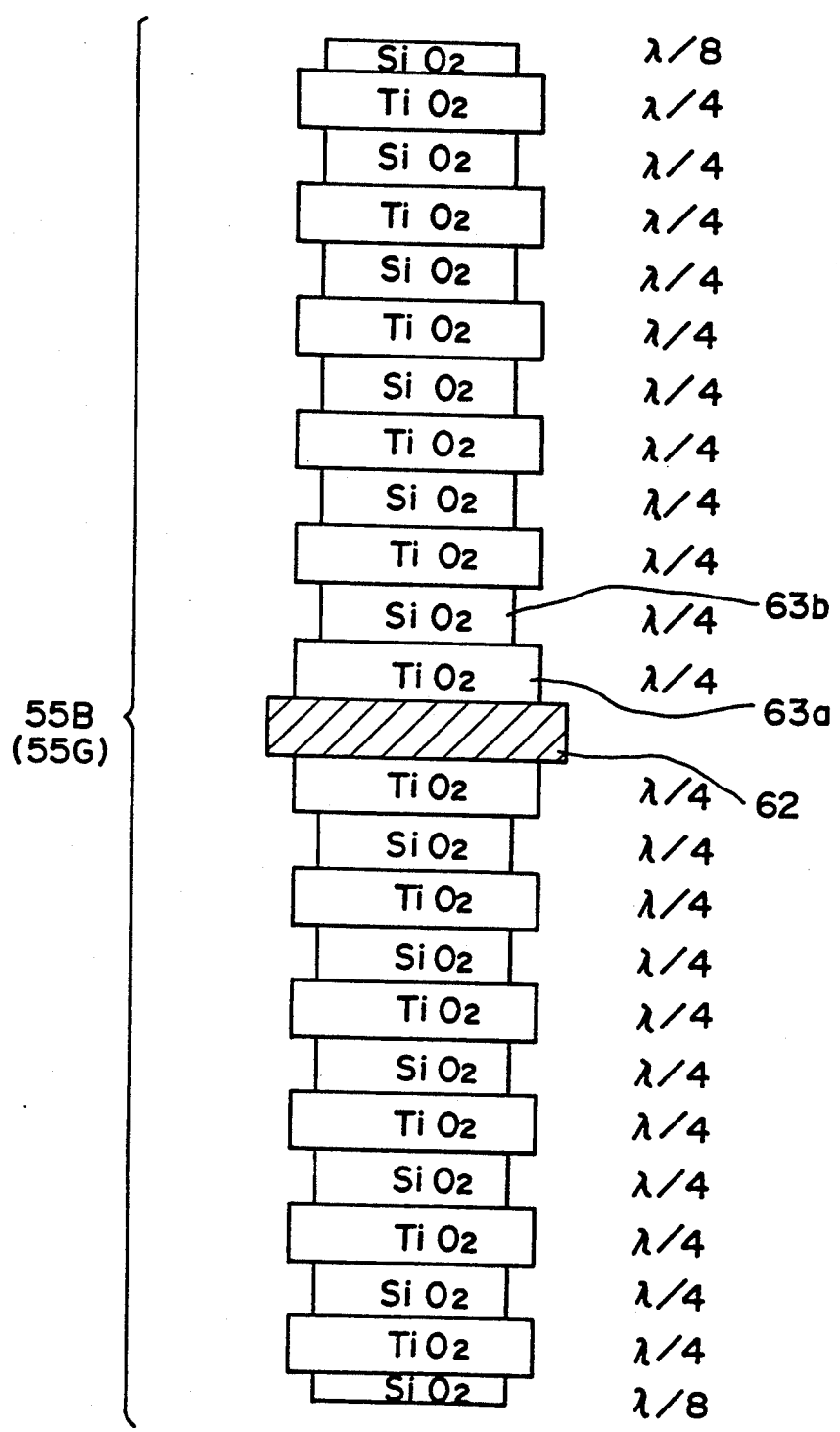
FIG. 10 is a diagram showing the construction of a transmission filter included in the filter unit of FIG. 2.

With reference to FIG. 10, each of the transmission filters 55B, 55G is an interference filter which comprises high refractive index layers ($TiO_2$) 63a and low refractive index layers ($SiO_2$) arranged alternately and laminated to each surface of a glass plate 62. Assuming that the design wavelength is $\lambda$, the first layer next to the glass plate 62 is a high refractive index layer with a thickness of $\lambda/4$, the second to 11th layers are layers with a thickness of $\lambda/4$, and the last 12th layer is a low refractive index layer with a thickness of $\lambda/8$. The arrangement of layers on opposite sides of the glass plate 62 are symmetric with respect thereto.

Figure 3:
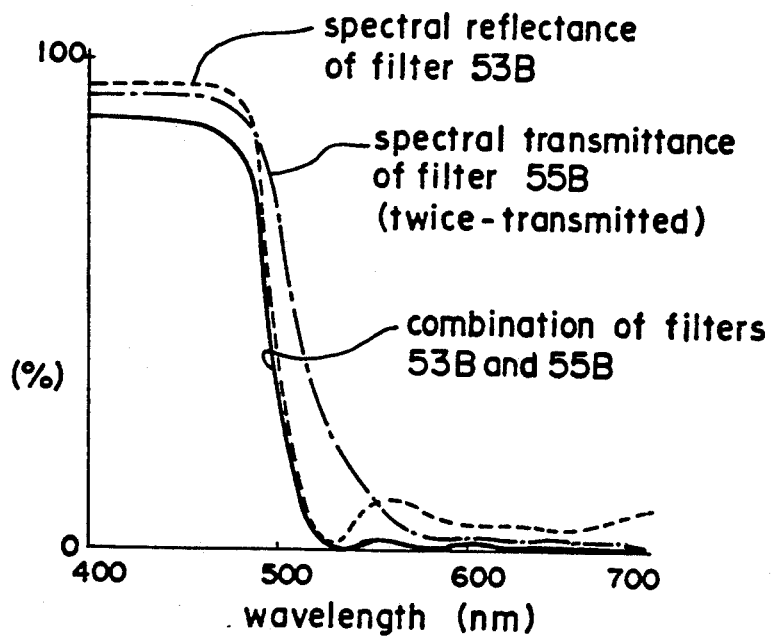
FIG. 3 is a diagram showing the spectral characteristics of the filter unit of FIG. 2 for a blue light.
Figure 6:
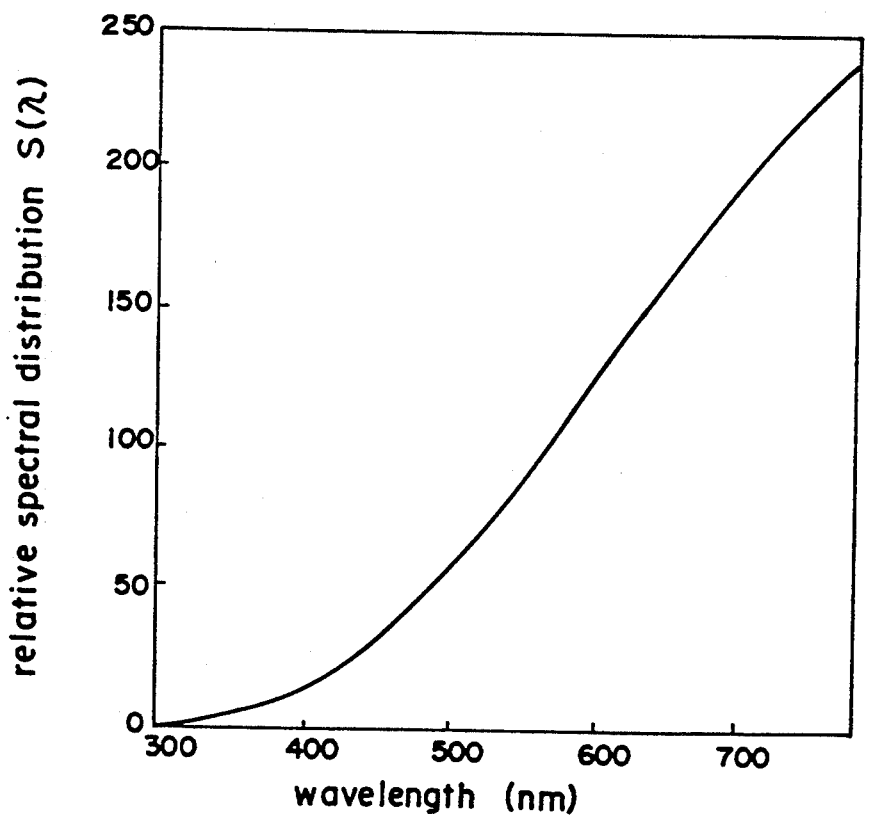
FIG. 6 is a diagram showing the spectral characteristics of illumination light for use in the color copying machine of FIG. 1.

FIG. 2 shows the spectral filter unit 24 with the reflection filter 53B and the transmission filter 55B positioned on the optical path. In this case, the unit 24 exhibits the spectral characteristics indicated in a solid line in FIG. 3, whereby a blue light only is separated off to impinge on the drum 2 for exposure. With reference to FIG. 3, the spectral characteristics of the reflection filter 53B, which are represented by a broken line, give a reflectance of 50% at 495 nm but involves a ripple component due to residual reflection in the wavelength range of not smaller than 525 nm. Especially when a halogen lamp is used as the exposure lamp 31, the illumination light exhibits a relative spectral distribution as shown in FIG. 6 and is less at short wavelengths, so that the ripple component at longer wavelengths produces a great influence. Accordingly, the transmission filter 55B having the spectral characteristics (when passing light twice) indicated in a dot-and-dash line in FIG. 3 is used in combination with the reflection filter 53B to block the ripple component.

Figure 7:
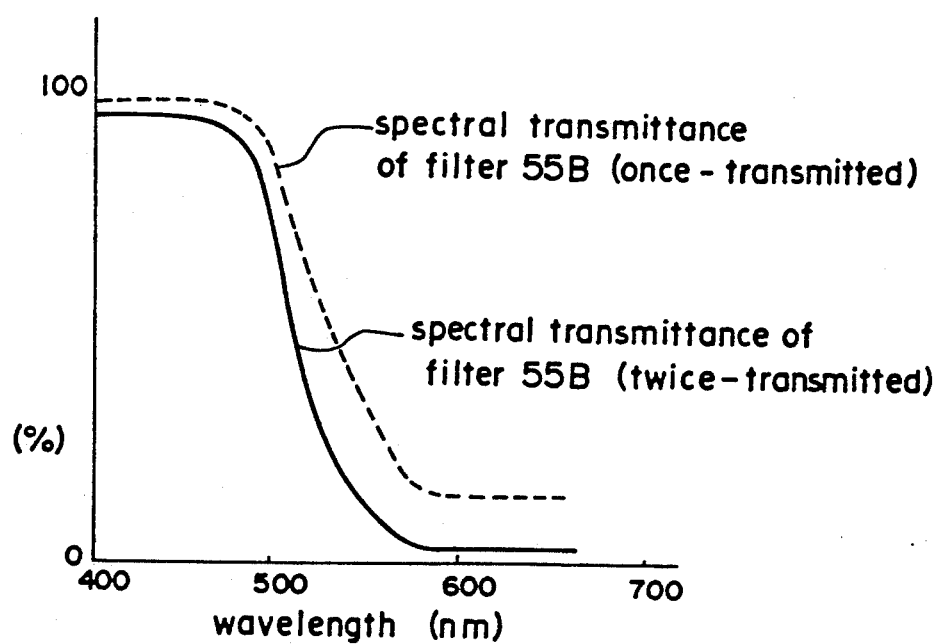
FIG. 7 is a diagram showing an alteration in the spectral characteristics due to a change in the number of passes through a transmission filter.

With the transmission filter 55B disposed in front of the reflection filter 53B, the light passes through this filter 55B twice. As seen in FIG. 7, the transmission filter 55B exhibits sharper spectral characteristics when passing light therethrough twice (solid line) than when passing light once. Thus, the interference filter of a reduced number of film layers affords satisfactory spectral characteristics when disposed as above.

An absorption filter can also be used instead of the interference filter.

Furthermore, the transmission filter 55B is disposed as inclined with respect to a plane perpendicular to the optical axis. This prevents the drum 2 from being exposed to the light reflected at the transmission filter 55B, and also diminishes the difference in wavelengths to be blocked due to the field angle in the case where the transmission filter is an interference filter. Suppose the field angle is 20 degrees when the transmission filter is perpendicular to the optical axis. When the filter in this case is positioned as inclined at 15 degrees, the field angle becomes 15 degrees at the central portion and 24.8 degrees at the peripheral portion. Thus, the variation in maximum field angle reduces, consequently producing an effect to diminish the difference in the wavelengths to be blocked.

Figure 4:
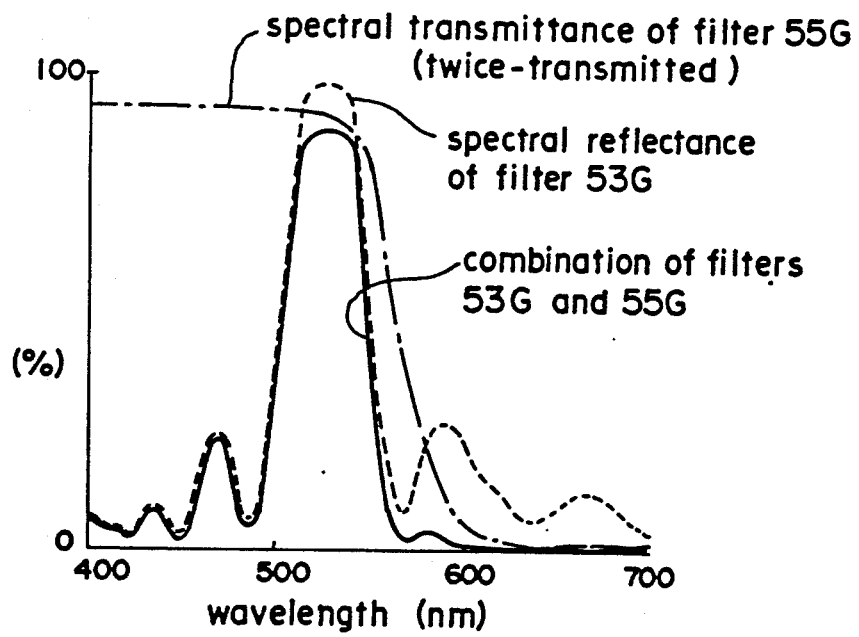
FIG. 4 is a diagram showing the spectral characteristics of the filter unit of FIG. 2 for a green light.

Next, when the reflection filter 53G and the transmission filter 55G are positioned on the optical path by rotating the rotary member 52, a green light only is separated off for the exposure of the drum 2 due to the spectral characteristics shown in FIG. 4. Satisfactory spectral characteristics are available also in this case by using the reflection filter 53G and the transmission filter 55G in combination and by passing the light through the transmission filter 55G twice.

With reference to FIG. 4, the ripple component at shorter wavelengths can not be eliminated despite the conjoint use of the transmission filter 55G, whereas the influence thereof can be made negligible by using a halogen lamp as stated above, since the relative spectral distribution is then small at shorter wavelengths as seen in FIG. 6.

Figure 5:
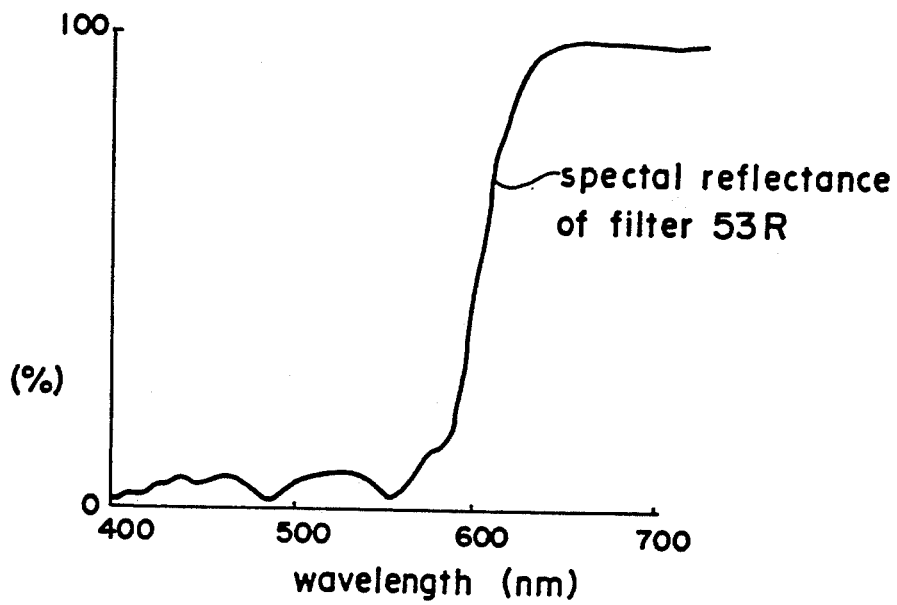
FIG. 5 is a diagram showing the spectral characteristics of the filter unit of FIG. 2 for a red light.

In the case where the reflection filter 53R is positioned on the optical path by rotating the rotary member 52, a red light only is separated off to expose the drum 2 to the light due to the spectral characteristics shown in FIG. 5. Since the reflection filter 53R only is not provided with any transmission filter, a ripple component is present at shorter wavelengths in this case, whereas if the halogen lamp is used as stated above, the influence can then be diminished to a negligible extent because the relative spectral distribution is small at shorter wavelengths as shown in FIG. 6.

Figure 8:
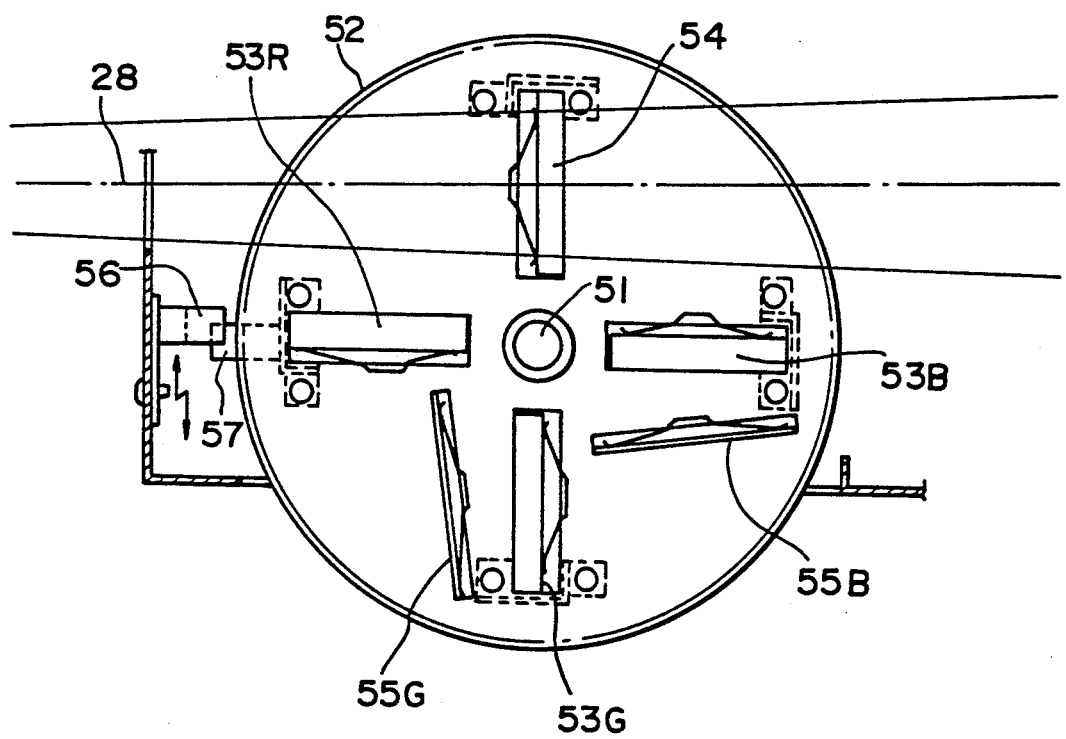
FIG. 8 is a view showing a digital optical path provided by the filter unit of FIG. 2.

When the light adjusting filter 54 is positioned on the optical path as shown in FIG. 8 by rotating the rotary member 52, a suitably adjusted quantity of light impinges on the CCD color image sensor 26 through the digital optical path 28 for image discrimination. Because the adjusting filter 54 is disposed in front of and adjacent to the reflection filter 53R which has no transmission filter in front thereof, it is unlikely that a transmission filter will advance into and interfere with the digital optical path 28 when the adjusting filter 54 is brought to the optical path.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A color separation system for separating a predetermined color component from an incident light, comprising:
    a reflection filter having a specific spectral reflectance; and
    a transmission filter having a specific spectral transmittance and being disposed in front of said reflection filter so that light passes through the transmission filter twice;
    wherein said reflection filter and said transmission filter are not positioned in parallel with respect to each other.

2. A color separation system as claimed in claim 1, wherein said reflection filter comprises an interference filter.

3. A color separation system as claimed in claim 1, wherein said transmission filter comprises an interference filter.

4. A color separation system for separating a predetermined color component from an incident light, comprising:
    a plurality of filter means, each having different spectral characteristics, at least one of said plurality of filter means including a reflection filter which has a specific spectral reflectance and a transmission filter which has a specific transmittance and is disposed in front of the reflection filter so that light passes through the transmission filter twice, wherein said reflection filter and said transmission filter are not positioned in parallel with respect to each other; and
    positioning means for selectively positioning each of said plurality of filter means in an optical path.

5. A color separation system as claimed in claim 4, wherein said reflection filter comprises an interference filter.

6. A color separation system as claimed in claim 4, wherein said transmission filter comprises an interference filter.

7. A color separation system as claimed in claim 4, wherein said positioning means includes a rotary member supporting said plurality of filter means.

8. A color copying apparatus comprising:
    a photosensitive member on which a plurality of electrostatic latent images are formed corresponding to a plurality of color components of a color original, respectively;
    illumination means for illuminating the color original;
    a plurality of filter means for receiving a light reflected from the color original and separating the plurality of color components from the received light, respectively, at least one of said plurality of filter means including a reflection filter which has a specific spectral reflectance and a transmission filter which has a specific spectral transmittance and is disposed in front of the reflection filter so that light passes through the transmission filter twice; and
    positioning means for selectively positioning each of said plurality of filter means in an optical path to expose the photosensitive member with light of each color component.

9. A color copying apparatus as claimed in claim 8, wherein said reflection filter comprises an interference filter.

10. A color copying apparatus as claimed in claim 8, wherein said transmission filter comprises an interference filter.

11. A color copying apparatus as claimed in claim 8, wherein said transmission filter is inclined with respect to a plane perpendicular to an optical axis.

12. A color copying apparatus as claimed in claim 8, wherein said positioning means includes a rotary member supporting said plurality of filter means.

13. A color copying apparatus as claimed in claim 8, wherein said illumination means includes a halogen lamp.

14. A color copying apparatus comprising:
    a photosensitive member on which a plurality of electrostatic latent images are formed corresponding to a plurality of color components of a color original, respectively;

an image sensor for reading an image of the color original;

illumination means for illuminating the color original;

a plurality of filter means for receiving a light reflected from the color original and separating the plurality of color components from the received light, respectively, at least one of said plurality of filter means including a reflection filter which has a specific spectral reflectance and a transmission filter which has a specific spectral transmittance and is disposed in front of the reflection filter so that light passes through the transmission filter twice;

light adjusting means for adjusting a quantity of light impinging on said image sensor; and positioning means for selectively positioning each of said plurality of filter means and said light adjusting means in an optical path to expose the photosensitive member with light of each color component and to expose the image sensor with light of adjusted quantity.

15. A color copying apparatus as claimed in claim 14, wherein said reflection filter comprises an interference filter.

16. A color copying apparatus as claimed in claim 14, wherein said transmission filter comprises an interference filter.

17. A color copying apparatus as claimed in claim 14, wherein said transmission filter is inclined with respect to a plane perpendicular to an optical axis.

18. A color copying apparatus as claimed in claim 14, wherein said positioning means includes a rotary member supporting said plurality of filter means and said light adjusting means in unison.

19. A color copying apparatus as claimed in claim 14, wherein said illumination means includes a halogen lamp.

20. A color copying apparatus as claimed in claim 14, wherein said light adjusting means includes a transmission filter.

21. A color copying apparatus comprising:

a photosensitive member;

illumination means for illuminating a color original;

blue, green and red filter means for receiving a light reflected from the color original and separating the corresponding color components from the received light, respectively, each of the blue and green filter means including a reflection filter which has a specific spectral reflectance and a transmission filter which has a specific spectral transmittance and is disposed in front of the reflection filter so that light passes through the transmission filter twice, the red filter means including only a reflection filter which has a specific spectral reflectance; and positioning means for selectively positioning each of the blue, green and red filter means in an optical path to expose the photosensitive member with light of each color component.

22. A color separation system for separating a predetermined color component from an incident light, comprising:

a plurality of filter means, each having different spectral characteristics, at least one of said plurality of filter means including a reflection filter which has a specific spectral reflectance and a transmission filter which has a specific transmittance and is disposed in front of the reflection filter so that light passes through the transmission filter twice, said reflection filter and said transmission filter being positioned nonparallel with respect to each other;

means for movably supporting said plurality of filter means; and positioning means for selectively positioning each of said plurality of filter means in an optical path.

23. A color separation system as claimed in claim 22, wherein said transmission filter is inclined with respect to a plane perpendicular to an optical axis.

* * * * *